United States Patent [19]
Wambeke

[11] Patent Number: 5,979,909
[45] Date of Patent: *Nov. 9, 1999

[54] ENVIRONMENTAL SEALING

[75] Inventor: Alain Wambeke, Zoutlewuw, Belgium

[73] Assignee: NV Raychem SA, Kessel-lo, Belgium

[ * ] Notice: This patent is subject to a terminal disclaimer.

[21] Appl. No.: 08/872,582

[22] Filed: Jun. 10, 1997

Related U.S. Application Data

[63] Continuation of application No. 08/129,201, filed as application No. PCT/GB92/00579, Apr. 1, 1992.

[30] Foreign Application Priority Data

Apr. 12, 1991 [GB] United Kingdom ................... 9107864

[51] Int. Cl.⁶ ....................................................... F16J 15/46
[52] U.S. Cl. ............................................................ 277/605
[58] Field of Search ...................................... 277/685, 646

[56] References Cited

U.S. PATENT DOCUMENTS

| | | |
|---|---|---|
| 907,136 | 12/1908 | Farrington et al. . |
| 2,151,466 | 3/1939 | Eken . |
| 2,306,160 | 12/1942 | Freyssinet . |
| 2,451,762 | 10/1948 | Millikan . |
| 2,816,575 | 12/1957 | Stokes . |
| 3,038,732 | 6/1962 | Scott et al. . |
| 3,222,076 | 12/1965 | Hollingsworth . |
| 3,339,011 | 8/1967 | Ewers, Jr. et al. . |
| 3,364,941 | 1/1968 | Harder . |
| 3,410,300 | 11/1968 | Mondano . |
| 3,491,825 | 1/1970 | Peterson et al. . |
| 3,496,969 | 2/1970 | Bruce et al. . |
| 3,584,671 | 6/1971 | Kampa . |
| 4,263,682 | 4/1981 | Bejarano . |
| 4,296,933 | 10/1981 | Tolliver . |
| 4,568,081 | 2/1986 | Martin . |
| 4,662,833 | 5/1987 | Bell et al. . |
| 4,790,544 | 12/1988 | Kemp . |
| 5,019,101 | 5/1991 | Purkait et al. . |
| 5,562,295 | 10/1996 | Wambeke et al. ...................... 277/605 |

FOREIGN PATENT DOCUMENTS

| | | |
|---|---|---|
| 0745514 | 11/1966 | Canada . |
| 0100228 | 2/1984 | European Pat. Off. . |
| 0152696 | 8/1985 | European Pat. Off. . |
| 0179657 | 3/1986 | European Pat. Off. . |
| 0210807 | 2/1987 | European Pat. Off. . |
| 1007314 | 10/1965 | United Kingdom . |
| 1065922 | 4/1967 | United Kingdom . |
| 1077314 | 7/1967 | United Kingdom . |
| 1155470 | 6/1969 | United Kingdom . |
| 1421960 | 1/1976 | United Kingdom . |
| 2006890 | 5/1979 | United Kingdom . |
| 2028601 | 3/1980 | United Kingdom . |
| 1594937 | 8/1981 | United Kingdom . |
| 2089664 | 6/1982 | United Kingdom . |
| 2151723 | 7/1985 | United Kingdom . |
| 0179722 | 4/1986 | United Kingdom . |

*Primary Examiner*—Anthony Knight
*Assistant Examiner*—John L. Beres
*Attorney, Agent, or Firm*—Herbert G. Burkard; Sheri M. Novack

[57] ABSTRACT

The present description pertains to a duct seal, or splice case seal, or other sealing member which is an inflatable envelope seal, having an opening directly through a wall of the envelope or between walls thereof through which a probe is inserted to introduce a pressurizing medium. A means is provided for sealing of the sealing member upon withdrawal of the probe. Preferably the pressurizing medium is air. Preferably the walls of the envelope are substantially non-stretchable. An internal flap may be provided across the opening through which the probe is inserted, where the internal flap seals in response to pressure from within the sealing member. The flap preferably comprises a flexible polymeric sheet fixed to a wall of the sealing member such that the probe can pass through the hole and displace the flap, with the probe preferably passing between the flap and the wall substantially in the plane of the wall and at an angle of less than about 45° to the plane of the wall. The opening through which the probe extends may be a lap join, and the opening may decrease in cross-sectional size toward the outside of the sealing member. A sealing material may be provided within the opening which is driven by internal pressure to block the opening upon withdrawal of the probe. A flap may be used in conjunction with the lap join opening.

21 Claims, 8 Drawing Sheets

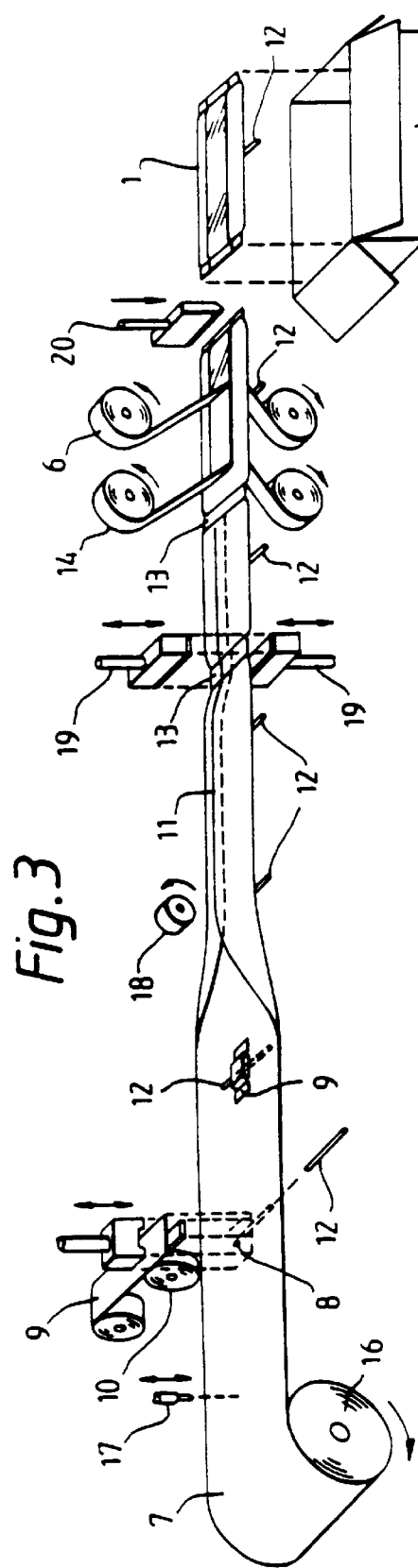
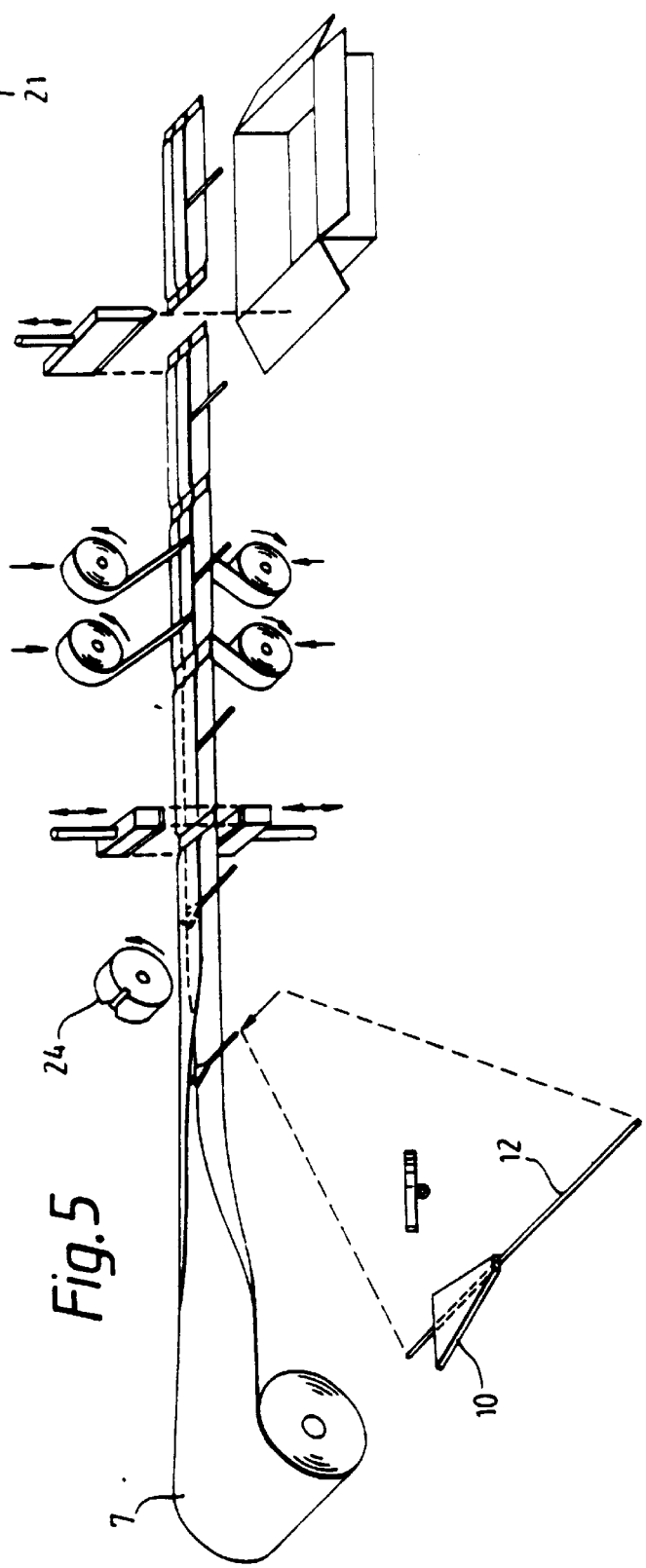
Fig.3
Fig.5

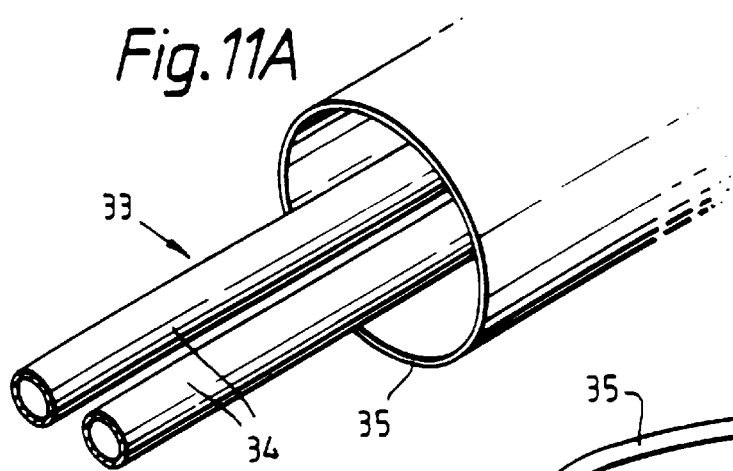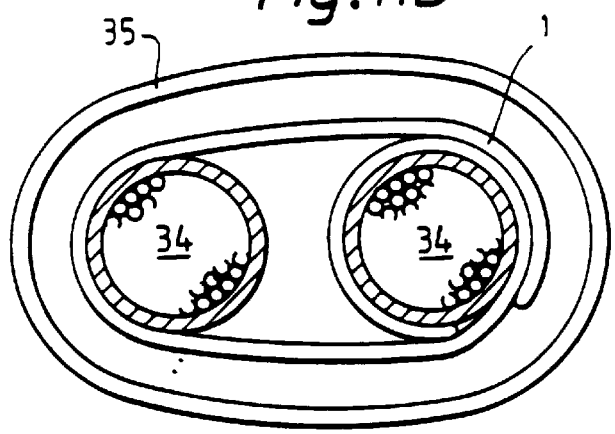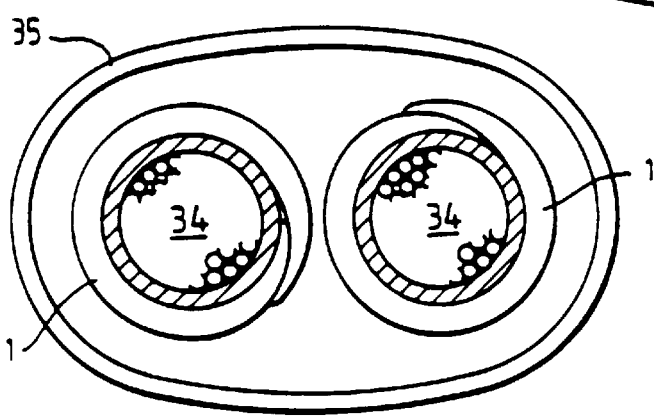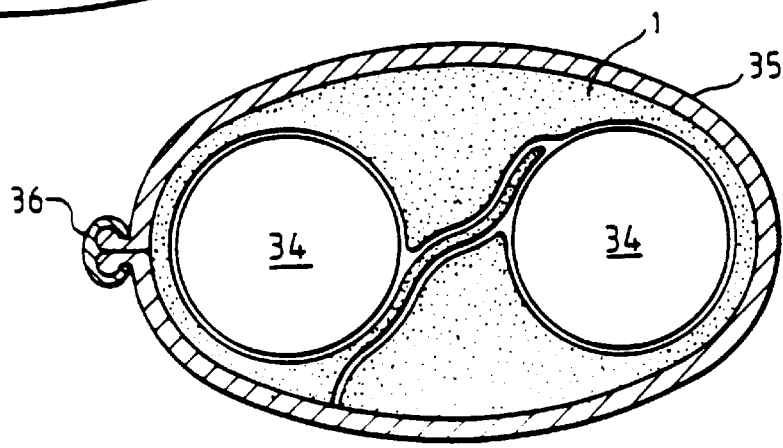

ENVIRONMENTAL SEALING

This application is a continuation of U.S. Ser. No. 08/129,201 filed on Oct. 8, 1993 which is a 371 of PCT/GB92/00579, filed Apr. 1, 1992.

BACKGROUND OF THE INVENTION

1. Field of the Invention

The present invention relates to environmental sealing of substrates such as cables or pipes, particularly within a duct. or a splice case. This may be done to prevent water, gas or other contaminant from passing along a duct into a manhole etc, or to protect a cable splice from the environment.

2. Description of the Related Art

The invention will be described primarily in terms of a duct seal, (which term includes "feedthroughs") but the invention is also applicable to other instances of sealing, including splice cases, pipe protection and grommets etc.

The reason that a seal (rather than an adhesive bond of no significant thickness) may be required is a disparity in size or shape between the substrate to be sealed and some other object such as a housing within which it lies. For example, a duct may be from several millimetres to several centimetres larger than the cable or other substrate that it carries, an oval cable may lie within a circular duct, or the installed size of a splice case housing may be larger than the spliced cables within it. Also, when a branch-out between two or more cables is to be sealed it will generally be necessary to convert their combined concave cross-section to a convex shape that can be enclosed by, say, a rigid wrap-around or other casing or by half-shells or a dimensionally-recoverable (generally heat-shrinkable) sleeve.

Such seals have usually been formed by the use of a conformable sealing member, for example an O-ring, or the use of a mass of sealant or a hot-melt adhesive. Whilst these seals in general work in a satisfactory manner, problems sometimes occur. For example, by their nature. conformable sealing members have a low modulus and especially where they are used to fill large voids, may have a tendency to creep over extended periods of time. Also, leak paths may occur if it has not been possible to introduce sufficient heat into a hot-melt adhesive to melt it. It is for example difficult to introduce heat into a duct.

Difficulties may also arise due to the materials needed for ducts and cables, which may be incompatible. Cables are often made of polyethylene or lead, and ducts of polyvinyl chloride, steel or cement which may be dirty or crumbly and difficult to clean.

A widely used duct seal, disclosed in Britsh patent number 1594937 assigned to the assignee of the present invention, comprises a hollow body member provided on its inner and/or outer surface with a plurality of spaced apart flanges, each flange extending away from and around said surface and at least a portion of the flange remote from said surface being deformable, but only at an elevated temperature, and at least part of said surface(s) and/or the surface of the flanges having a sealant thereon.

European patent application publication number 0179657 assigned to the assignee of the present invention discloses a duct seal especially for sealing about four cables which contains a spring which, when operated, radially-expands that part of the duct seal that is to seal to the duct. The cables are sealed by heat-shrink outlets of the duct seal. The spring is operated after heating the part of the duct seal in which it lies. Heating may soften the material of the seal and activate an adhesive.

European patent application publication number 0152696 assigned to the assignee of the present invention discloses an assembly for sealing an aperture (such as that between a duct and a cable it carries) which comprises a flexible envelope that is arranged to be wrapped on itself for insertion into the aperture, the envelope having an opening therein for receiving an expansible or expanding filler material. for example a curable foam, for expanding the envelope, a container containing said expansible filler material. and means arranged to connect the container to the envelope to conduct the filler thereto for effecting expansion of the envelope. characterized in that an adhesive or sealant is located on or associated with at least part of the outer surface of the envelope.

Other patent specifications disclosing hollow envelopes for sealing include the following. European patent application publication number 0100228 assigned to the assignee of the present invention discloses a method forming a seal between at least one elongate object and a surface surrounding the or each object. which comprises:

(a) positioning between the object and the surface a flexible envelope containing a void-filling composition which is capable of undergoing a change from a state of lower viscosity to a state of higher viscosity;

(b) deforming at least part of the envelope thereby causing the void-filling composition to conform to the object and to the surface; and (c) causing said change from lower to higher viscosity.

European patent application publication number 0210807 assigned to the assignee of the present invention discloses a double-walled article, two of which may be used one around the other to form a duct seal, in the form of a tube having a small volume filling of a friction reducing liquid (preferable of high boiling point and low vapour pressure) or solid between its two walls. The article is able to revolve over a substrate by shear between its two walls to provide environmental or electrical protection.

Britsh patent number 2006890 discloses a seal comprising a container formed from resilient plastics sheet and partially filled with a liquid which is provided between a protective tube in a wall and insulation layer around a pipe. The container is of substantially toroidal shape and permits the pipe to move axially and radially whilst maintaining a seal between the insulation layer and the tube.

U.S. Pat. No. 3,038,732 discloses an inflatable seal bushing for sealing a pipeline casing, which comprises a hollow resilient means having an inflated configuration to match the inside surface of said casing and to contact the outside surface of the pipe of said pipeline. means for introducing a fluid into said hollow resilient means to inflate same, and a plurality of angularly disposed. relatively solid spacer means integral with said hollow resilient means and transverse thereto for centring and supporting said pipe within said casing, each of said spacer means having a passage therethrough for providing liquid communication in the hollow interior of said hollow resilient means.

U.S. Pat. No. 2,816,575 discloses an apparatus for laying a pipe employing inflated annular sealing rings.

U.S. Pat. No. 3,339,011 discloses a pneumatically-sealed cable splice case comprising a longitudinally-split sealable cylindrical casing having means within and adjacent to each of its longitudinal ends to retain and space apart a pair of end wall panels each end wall panel including two semi-circular disc portions having rounded outer edges and inner edges including aligned cut-outs therealong.

whereby cables may enter said casing through said aligned cutouts, and inflatable seal means confined between each of said pair of panels of said end walls and having openings aligned with said panel openings, said inflatable means being expandable, when so confined, against such cables passed through said end wall openings, characterized in that said end walls are removable from the said means to retain them, and said semi-circular disc portions are pivotally pinned to each other with their cut-outs presented together to form said openings of said panels whereby said semi-circular disc portions may be pivotally opened apart for placement about said conduits.

An inflatable packing device for insertion between mating surfaces of the hub and spigot ends of a pipe joint is disclosed in British patent number 1077314.

A hollow-walled sleeve into which fluid is to be injected for heat-insulation of ducts is disclosed in British patent number 1421960.

An inflatable closure member having a sealing material thereof, and used for sealing cables is disclosed in British patent number 2028601.

U.S. Pat. No. 9,07,136 discloses a packing for pipe joints formed by folding an open mesh fabric and applying a glue etc.

Whilst many of the articles disclosed in the above specifications are able to provide satisfactory seals, some problems remain. For example the use of curing or otherwise setting materials may prevent or make difficult subsequent removal of the article, and simple gas pressurization of a seal will generally mean that the article has a short life-time due to leaks or gas-diffusion. Also expensive,. cumbersome, easily-damaged and corrodable metal valves are required that protrude from the articles.

SUMMARY OF THE INVENTION

I have now devised a duct seal or splice case or other sealing member that can in certain embodiments avoid the problems described above with reference to the know art, and can function by simple air pressure inflating an envelope in the space between for example the duct and a cable it carries.

A surprising result is that I have been able to retain significant pressure for extremely long periods. Testing has indicated periods of at least 5 years and longer without the need for unsuitable prior art valves.

Thus the present invention provides a flexible hollow sealing member (preferably having substantially non-stretchable walls) that can be inflated to seal a gap between first and second articles and that has:

a hole directly through a wall or between walls thereof through which hole a probe can be inserted (and from which it can preferably be removed by mere pulling) to introduce pressurizing medium into the member, and means by which the hole is automatically sealed on withdrawal of the probe.

The product may be supplied with the probe inserted through the hole. Furthermore, insertion of the probe may be part of the manufacturing process of the sealing member.

Such hollow sealing members were subjected to sever mechanical, temperature and pressure testing, and successful results were obtained. In particular, the sealing members were inflated to 50 KPa and tested for leaks for fifteen minutes to measure overall strength, and for 2.8 bar for long-term testing. Helium was used for inflation, and a sophisticated helium gas detector was used to monitor any leaks. I was able to produce an automatically sealing system where passage of helium through the hole used for pressurization was no greater than the background level resulting from mere diffusion through the walls away from the hole. Suitable wall materials (discussed below) can be chosen such that no helium is detectable. The precise nature of the materials and the design of the sealing member can be chosen depending on intended use; the surprising result, however, is that a hole directly through a wall of the member, or between the walls of a lap join etc can automatically seal without the need for expensive valves and all the disadvantages they bring. It is believed that inflatable articles have never previously been used for environmental sealing (particularly in the cable accessories art) where life-times of many years are required without the need for periodic reinflation.

BRIEF DESCRIPTION OF THE DRAWINGS

FIG. 3 illustrates an in-line process for making a sealing member as shown in FIG. 2.

FIG. 5 illustrates an in-line process for making a sealing member as shown in FIG. 4.

FIGS. 11A, 11B, 11C, and 11D show sealing of a branched cable splice using the sealing member.

DETAILED DESCRIPTION OF THE INVENTION

Figure 1:
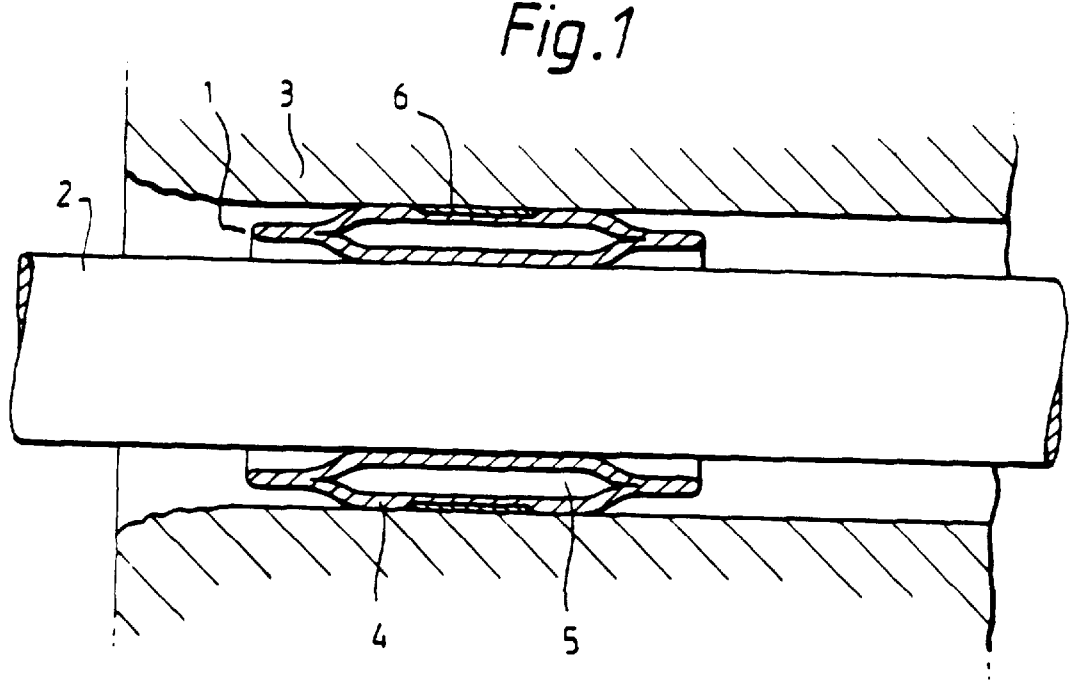
FIG. 1 shows a duct seal in use.

Whilst the exact design of my sealing system will be chosen according to the intended use of the product, I prefer designs incorporating one or both of the following features.

Firstly, an internal flap may be provided across the hole in or between the walls of the member. The flap may seal in response to pressure within the member. The flap preferably comprises a flexible polymeric sheet fixed to a wall of the member such that the probe can pass through the hole and displace the flap, the probe preferably passing between the flap and the wall substantially in the plane of the wall (say at less than 45° to that plane). A sealing material, for example a gel or a mastic, may be provided between the flap and the wall, for example as a coating on the flap. The flap may be bonded or welded to the wall along two lines separated by a small gap (say 5–20 mm), such that the probe can be inserted through the hole in the wall and between the wall and the flap generally along the axis of the channel formed between the two bond or weld lines.

The second design is particularly appropriate where the hole is between overlapping walls of a lap join. (The lap join may arise in formation of the member by forming a tube from a sheet of material.) The hole, which extends the width of the lap join, may decrease in cross-sectional size toward the outside of the sealing member. The hole may therefore have a funnel, or flattened-funnel, shape. A sealing material (preferably a mastic or a gel) may be provided within this funnel-or-other-shaped hole, such that the sealing material is driven by internal pressure to block the hole. The size of the hole and the physical properties and amount of the sealing material may be chosen such that the material does not creep out of the hole to an unacceptable extent. A flap as mentioned above may be used in conjunction with this type of hole.

The sealing material may comprise for example a mastic or a gel. Mastics may be preferred due to their good adhesion to the wall of the sealing member. A seal can therefore remain even on loss of some or all of the internal pressure that forces the flap against the wall. Mastics however have high. generally 100%. compression set and where that is likely to be a problem the mastic may be replaced or supplemented by a gel. For example if the probe is likely to leave a channel in the mastic on withdrawal, a gel could be provided as a supplementary layer between the mastic and the wall, preferably of smaller surface area than (and therefore totally surrounded by) the mastic. A gel may be formed by oil-extension of a polymeric material. The polymeric material may be cross-linked. I prefer that the gel has a hardness at room temperature as determined using a Stevens-Volland Texture Analyser of greater than 45 g, particularly greater than 50 g especially greater than 60 g. It preferably has a stress-relaxation less than 12%, particularly less than 10% and especially less than 8%. Ultimate elongation, also at room temperature, is preferably greater than 60%, especially greater than 1000%, particularly greater than 1400%, as determined according to ASTM D638. Tensile modulus at 100% strain is preferably at least 1.8, more preferably at least 2.2 MPa. In general compression set will be less than 35%, especially less than 25%. Preferred gels are made by extending with an oil block copolymers having hard blocks and rubbery blocks. Examples include-triblock copolymers of the styrene-ethylene-butylene-styrene type (such as those known by the Shell Trade Mark Kraton, eg G1650, 1651 and 1652). The amount of block copolymer may be, say from 5–35% of the total weight of the gel, preferred amounts being 6–15%, especially 8–12%. The amount of copolymer, and its molecular weight may be varied to give the desired physical properties such as hardness.

The designs described above will find particular use for environmental protection of supply lines such as pipes and cables particularly telecommunications cables. In particular. they may be used for the formation of duct seals or splice cases. In the case of duct seals, the first article as referred to above will comprise a cable carried by a duct. and the second article will comprise the duct. The duct seal will seal the annular space between the cable and the duct, and serve to prevent contaminants. in particular water, passing along the duct, for example into a manhole or building or other region to be kept dry or clean. Pressure may build up in the duct. and it is therefore desirable that means be provided for restricting movement of the duct seal along the duct in response to a pressure difference across it.

To this end, I also provide a flexible hollow sealing member that can be inflated to seal a gap between first and second articles (for example the cable and duct respectively), and that has:

a first surface that will contact the first article, and a second surface that will contact the second article, an average coefficient of friction of the first surface being less than that of the second surface such that the sealing member will not move with respect to the second article under a pressure difference across the member of 35 KPa, and preferably also 70 KPa, whilst allowing movement of the first article relative to the sealing member.

In this way, I allow for movement of the cable (etc) relative to the duct, whilst maintaining the desired seal.

Coefficients of friction can be chosen by varying coatings and supplementary layers on the outer surfaces of the flexible member. For example, I prefer to provide a sealing material, such as a gel or a mastic, or a rubber or other elastomeric foam, on an external surface of the sealing member. Such a sealing material can seal voids between the sealing member and the duct. for example within creases formed in the sealing member when it is wrapped around a cable.

If a mastic is used, a release layer may be desirable in order that the duct seal be easily handled, in particular so that it can be readily inserted into the duct. A thin, flexible polymeric film may be provided on an outwardly-facing surface, for example over a mastic layer. Such a film can allow the mastic to deform to fill voids thereby eliminating leak paths, it can reduce tack facilitating installation, and can have a very high coefficient of friction. particularly to plastics materials such as polyvinyl chloride and polyethylene. typical materials from which cables and ducts are made. Preferred films comprise linear low density polyethylene, such as that known as "cling film". The surface of the sealing member that will face the duct may be covered with such a film to a greater extent (and optionally completely) providing greater friction to the duct than to the cable. The film may have apertures in it, allowing some direct contact between sealing material and first or second surfaces. The film may be provided between two layers of mastic or other sealing material to provide the combined laminate with strength. In that case, apertures in the film allow the two layers to bond to one another directly.

In use, there may be a tendency for a sealing material on the sealing member to be displaced, for example by pressure within a duct. Displacement can be restricted by means such as a strip of foam on a surface of the sealing member that can act, for example, as a dam.

In a further embodiment of the invention, preferably employing the automatic sealing referred to above, the invention provides a flexible hollow sealing member that can be inflated to seal a gap between first and second articles and that has:

a hole through which a pressurizing medium can be introduced into the member, and an internal flap that seals across the hole in response to pressure within the member.

In another embodiment, the invention provides a flexible hollow sealing member that can be inflated to seal a gap between first and second articles and that has in a wall thereof a substantially planar one-way valve substantially parallel to the plane of the wall.

The invention also provides a kit of parts for environmentally-sealing a first article such as a cable, which comprises:

a second article comprising a substantially rigid housing within which at least part of the first article can be placed. and a sealing member of the invention.

The housing may be blind at one end, one or more sealing members being used to seal a cable entry and exit at the open end. In this way a cable splice may be produced, to seal what is known as a radial distribution point in a telecommunications distribution network. Such design may also be useful for sealing a splice between optical fibre cables. In this case, the housing may contain one or more optical fibre splice organizers.

In another design the housing has at least two open ends, allowing production of an in-line (rather than butt) splice case, for copper or fibre cables. Such a housing may be of tubular or wrap-around design. Where branching cables are to be sealed, the sealing member may be positioned between branching cables, and between those cables and the housing, or other second article. In general, the member will pass between the branching cables and be wrapped around the branching cables together.

The invention also provides a method of environmentally-sealing a first article, such as a cable, which comprises:

- at least partially positioning the first article within a second article (such as a duct or a wrap-around or other housing),
- positioning between the first and second articles a sealing member of the invention, and
- inflating the sealing member to seal a gap between the first and second sealing members.

Inflation may be carried out by attaching a probe to a source of pressurizing fluid and (if it is not supplied in place) inserting the probe through the hole in the wall or between walls of the sealing member. The pressurizing fluid is preferably compressible. air or nitrogen or other inert gas being preferred. If a liquid, such as water is used it will generally be necessary for the sealing member to be stretchable in order that a reserve of pressure be provided to compensate for movement of the first and second surfaces. If the sealing member is stretchable is is likely to be subject to creep or set. I prefer that it have minimal stretch and that a gas be used for inflation.

The probe, when inserted, will provide a path past the internal sealing flap or sealing material allowing the fluid to inflate the sealing member. The sealing member, being flexible, will deform into sealing engagement with the first and second articles, for example by filling an annulus between a cable and a duct within which it lies. A seal can be made inspite of lack of concentricity between duct and cable, and inspite of oval or other awkward cross-sectional shapes of the cable and/or duct. When the desired internal pressure is reached, the probe may be simply withdrawn, allowing the internal pressure automatically to close the hole. Astonishingly, high internal pressures can be achieved and a seal that will last for many years can be made in this way. The probe is preferably held in position prior to and/or during inflation merely by friction and/or by weak adhesion, allowing it easily to be pulled free. There is preferably no mechanical interlocking. The probe is preferably therefore substantially cylindrical at least at the end that enters the sealing member. The probe may comprise metal or a plastics material and may have a low coefficient of friction with the flap, the wall and/or any sealing material between them in order to facilitate removal.

It is desirable that inflation be not too rapid since the sealing member itself, and any sealing material it carries must deform properly into sealing engagement with cable and duct. A hand pump (such as a bicycle pump), an electric pump, a pressurized gas cylinder or other suitable pressurizing means mav be used. More powerful pumps may desirably be used with a pressure reducer.

The sealing material or the flap or other means mav be delivered on site (or otherwise) by means of a probe. and in particular by means of the probe used for pressurization. Such a probe may have at its end a flap, in a collapsed configuration for example rather like a closed umbrella. In this form it can be inserted through the hole in the sealing member, and on withdrawal of the probe the flap unfolds (for example in the way of opening an umbrella) and becomes deposited on an inner surface of the wall of the member.

In one embodiment, a probe carries a plug at its end which can be forced through the hole in the wall and which is retained within the sealing member on withdrawal of the probe, optionally in the manner described above. The probe has a hole in its wall for supply of air etc, that hole being some short distance away from the end carrying the plug. When the probe is inserted fully into the sealing member, the hole in the probe delivers air into the sealing member. When sufficient pressure is achieved, the probe is withdrawn causing the pressurizing air to escape to ambient, the hole now lying outside the sealing member. Further withdrawal removes the probe completely, leaving the plug behind to seal the hole in the wall.

The present invention may also provide (with or without the features referred to above) a duct seal for sealing a space between a duct and a substrate carried by the duct, which comprises a hollow inflatable gas-impermeable envelope formed by a method which comprises:

(a) folding a substantially flat sheet preferably a single sheet to form one or more lap joins. and (b) bonding and/or welding together adjacent lavers at said joins.

It may be desirable that none of the joins formed is subject to peel when the envelope is inflated. at least when it is in the duct. This mav be achieved if the pressure either side of a join is balanced. and such joins will in general be subjected to shear. Their widths are preferably at least 2 cms, more preferably at least 4, which provides a long leak path of very small cross-sectional size. As a result loss of internal pressure from within the envelope may be expected to be very small.

However, I have found that welding, particularly "picture-frame" hot welding in the factory can produce joins which although later in peel are strong enough.

In order to ease the folding, and to reduce the chance of leak paths that may result if a fold is not sharp, I prefer that at each fold line a maximum of two thicknesses of the sheet is folded.

The envelope is wrapped or otherwise positioned around a cable within a duct (for example by sliding it into the duct) and then inflated with any suitable medium, such as air or other gas. The envelope deforms to fill the space between the duct and the cable. Deformation is preferably without significant stretching, say less than 6%, particularly less than 4% in length, and less than 12%, particularly less than 9% in width. Any stretching preferably occurs within a few days of installation, with no subsequent creep. The envelope will generally comprise a single thickness on one side, and two or more thickness on the opposite side (for example at a lap join). The single thickness, which will be the more flexible may usefully face the cable since it will be forced to conform to a smaller diameter and it will buckle or otherwise adapt more easily. The opposite side may face the duct.

The deformation of the envelope may result from the vapour pressure exerted by a high vapour pressure liquid therein. The use of such a liquid, and sealing articles containing such a liquid is inventive in itself. irrespective of the envelope design. Life-time may be even greater when employing such a liquid since loss of its vapour will not result in a pressure reduction so long as there is some liquid left.

In general, the duct seal of the invention may be considered in terms of a pressurizing fluid acting on a moveable wall, either directly or indirectly, the wall preferably being substantially not-stretchable under installation and service conditions.

Installation of the duct seal need not, and in general will not, involve heating. This might be advantageous not merely because an awkward method step is avoided, but also because subsequent shrink-back on cooling is avoided. The fact that solidification of a sealing material may be, and generally will be, avoided means that the seal might be more tolerant of movement during service life, and also might mean that shelf-life before use is not a problem. Thus, various problems encountered with prior art duct seals are avoided.

I prefer that the fluid be in contact with the wall of the sealing member, although it need not be and movement of the wall may be brought about by mechanical means interconnecting the wall and some other object directly against which the fluid pressure acts.

The moveable wall preferably forms at least part of a flexible hollow article which preferably contains the fluid. It is possible, however, for the fluid to be located in a reservoir remote from the wall and the substrate, and for it to be in communication with the wall by a pipe. This is not at present preferred since I prefer that sealing be achieved by a self-contained article and that external pipe-work be avoided. The article may be supplied with a container containing a certain amount of fluid. preferably sufficient for one filling, preferably as a kit-of-parts. An example might be a small cylinder of carbon-dioxide, or other gas, such as that used for pressurizing soda syphons.

The wall will in general be preferably flexible, and thus able to conform to substrates of various sizes and/or of irregular or awkward shape. It may comprise at least three layers. for example one serving to retain the fluid. one to provide mechanical strength for example tensional strength against internal pressure, tear-strength or puncture resistance and one layer serving to form a seal to the substrate by accommodating small scale irregularities in the surface of the substrate. To this end the wall may comprise a first layer of metal (or metallized plastics material or metal-coated plastics material) optionally with which the fluid is in contact, and a second strengthening layer such as high density polyethylene, together with a third layer, in direct or indirect face-to-face relation with the first layer, and positioned between the first layer and the substrate. The third layer referred to above may comprise a deformable material such as a rubber or other elastomer or a foam. Other materials may be used as this third layer, for example sealing materials such as sealants, for example as referred to above. I prefer for many uses that no permanent adhesion occur between the sealing member and the duct and cable. In general I prefer that the second layer have a hardness of from 35–85, more preferably 40–80, especially 45–75 shore. The various functions referred to above may, however, be provided by fewer layers, where one layer has two or more functions.

The wall may comprise for example a laminate of a metal film and a layer of plastics material either side. Such plastics layers may allow the wall to be heat-welded to itself to make the envelope. A flap weld or bond, which will be under shear rather than peel when the article is inflated, preferably extends along the length of the sealing member where the sealing member is generally cylindrical. Simple welds that will be in peel may then be formed by hot stamping to close its ends.

Additional layers may be provided for mechanical strength such as oriented, for example biaxially-oriented or two layers of uniaxially oriented, high density polyethylene such as that known by the trade mark Valeron. A possible structure is as follows; the dimension being merely preferred.

| | |
|---|---|
| Copolymer | 15–30 microns |
| Valeron (trade mark) | 40–160 microns |
| Mylar (trade mark) | 10–30 microns |
| Aluminium (as one or more layers) | 5–60 microns |
| Mylar (trade mark) | 10–30 microns |
| Linear low density Polyethylene | 0–80 microns |
| Copolymer | 15–30 microns |

An alternative structure comprises

| | |
|---|---|
| Rayofix T (trade mark) | 75–125 microns |
| Polyester "O" (such as Mylar) | 75–125 microns |
| Aluminium | 8–16 microns |
| Polyester "O" (such as Mylar) | 75–125 microns |
| Rayofix T | 75–125 microns |

"Rayofix" is a terpolymer comprising ethylene butylacrylate, acrylic acid and ethylene groups.

These structures may be varied for example by omitting the mylar or using a different material in its place. Furthermore, each layer may be provided with a coating to aid bonding or welding, for example a polyurethane may be applied and suitable thickness corresponds to 3.7 g/m$^2$. The copolymer should allow heat bonding or welding, and may comprise a hot melt adhesive such as one based on ethylene vinyl acetate. Greater thickness of the copolymer (for example up to 200 microns could be used at bond/weld lines for better filling to cover irregularities. Additionally or alternatively a polyamide based adhesive could be used. The structure preferably has an elongation to break of at least 10%, preferably at least 20%. This structure may be used within an envelope for example one comprising a polymer such as an elastomer, such as rubber, optionally reinforced for example with nylon. Alternatively, it may be laminated to such a polymer, or it may be used alone. The additional material may reduce creep.

In general, it is merely necessary that sealing contact between the duct wall and the cable or other substrate occur along a line that cuts across any potential leak path, although an area of contact of significant width may be preferred. It may be sufficient, therefore. for a sealing member to have a thin strip of rubber, or other layer such as gel or mastic referred to above, that extends over part only of its surface.

The sealing member preferably comprises a substantially flat (which term includes flattenable, since the article may be set in a curved or similar shape) flexible envelope that can be wrapped around an elongate substrate such as a cable to form an annulus which can be deformed by internal pressure to increase its radial thickness. In this way, an annular gap between a duct and a cable it carries may be sealed.

The sealing member may contain a sheet of material that gives it stiffness or shape, and/or which acts as a release layer preventing its opposing surfaces sticking together, for example during heat bonding or welding of edges during its formation.

I have found surprising success in sealing various shapes of substrate using a sealing member in the form of a flat envelope formed simply by bonding or welding together around their edges one or more initially flat rectangular sheets of material in the way described. Nonetheless, for some purposes it may be desirable to provide a hollow article which has an outwardly-facing convex surface for sealing engagement with an internal surface of a duct etc within which the article is positioned. Such a hollow article may alternatively or additionally have an outwardly-facing concave surface for sealing engagement with a cable or other substrate around which the article is positioned. Such curved surfaces, which might reduce leak paths through avoidance of wrinkles and allow lower internal pressures to be used, may be achieved by thermoforming a flat surface or be formed ab initio by moulding. Nonetheless, the sheet from which the envelope is made may be regarded as substantially flat since it is not in the form of a tube that merely has its ends bonded closed.

The article is preferably of so-called "wrap-around" design, a term well-known in the cable accessories art meaning having the ability to be installed around a cable without access to its ends. (Reference may be made to GB 1155470 which discloses a wrap-around sleeve.)

Where a high vapour pressure liquid is to be used, it will be chosen according to the particular substrate to be sealed and to the environment within which it is to be used. In general, the liquid is preferably non-toxic, non-inflammable, non-corrosive to the substrate and to the article containing it, and also has no deleterious effect on any component of the environment now thought to be at risk. The most important properties of the liquid are its boiling point, and vapour pressures over a range of temperatures. We prefer that its boiling point at atmospheric pressure be less than 10° C., more preferable less than 0° C. particularly less than –5° C., although for some uses it could be up to say, 15° C. Its vapour pressure at 0° C. is preferably at least 0.25, more preferably at least 0.5, especially at least 0.7 bar gauge. We also prefer that the vapour pressure does not exceed 5 bar gauge, particularly 4 bar especially 3 bar at 25° C. more preferably at 20° C. Such properties may be, and preferably are, achieved with a single liquid and its vapour, although mixtures of different components including liquids and gasses such as air may be used. A mixture of a high vapour pressure liquid and a low vapour pressure may be used to achieve a desired pressure. Mixtures may however vary in composition with time as one component preferentially evaporates. unless a suitable azeotrope be found. Suitable liquids include fluorocarbons. marketed under the ICI trade mark Arcton. such as Arcton 134A possibly with Arcton 114. Arcton 134A is $CH_2FCF_3$, and Arcton 114 is $CHF_2CHF_2$.

With reference to the drawings

FIG. 1 a sealing member 1 is shown as a duct seal, sealing an annular gap between a cable 2 (the first surface as referred to above) and a duct 3 (the second surface). The sealing member 1 has flexible. and preferably substantially non-stretchable, walls 4 between which a pressurizing fluid such as air is introduced. An outer surface of the walls 4 may be provided with a sealing material 6, such as a mastic, to fill irregularities in the surface of the duct.

Figure 2A:
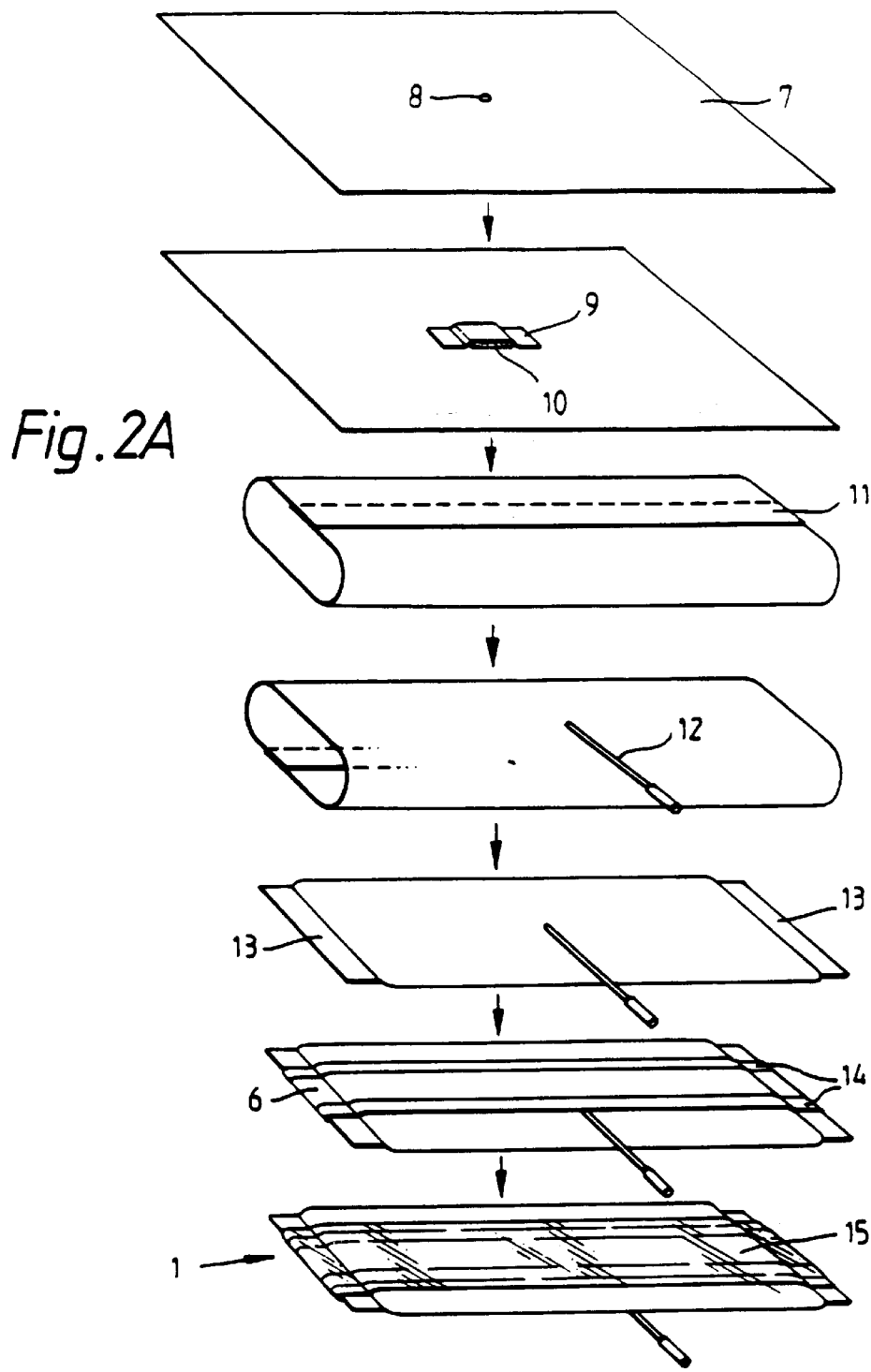
FIGS. 2A and 2B show formation of a sealing member of the invention.

FIG. 2A shows a way in which a sealing member 1 may be made.

A sheet 7 of material, preferably a laminate, is provided with a hole 8 through which a probe will later be inserted to inflate the sealing member. The hole 8 is covered with a flap 9, a sealing material 10 optionally being provided between the sheet and the flap 9. Next, the sheet 7 is formed into a tube, and a lap join 11 is formed by welding or bonding. In the next step a probe 12 for later pressurization is positioned along the surface of the sheet 7 and into the hole 8. Thus, the product may be supplied with such a probe in place. Alternatively, the probe may be supplied separately. In that case, it may be desirable for some means to be employed in manufacture to prevent a future path for the probe from becoming blocked, or at least to provide indication as to where the probe should later be inserted since the hole 8 will in general not be visible.

After insertion of the probe 12, end seals 13 are made, again by welding or bonding, optionally with folding. The following step involves applying inner sealing material 6 between foam or other dams 14 that restrict its displacement during service. The outer sealing material 15 has been applied in the last step. Such a layer may be covered by a cling film or other suitable very thin and very flexible layer. It may serve to reduce tack, and increase friction. The outer and inner extra layers may be reversed (particularly when employing the funnel design explained in connection with FIG. 4 below).

Figure 2B:
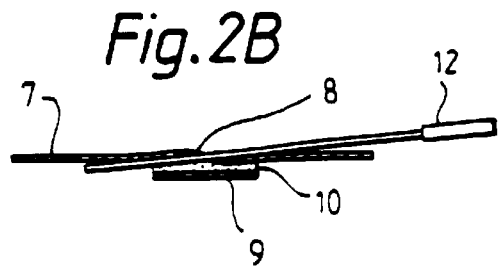

FIG. 2B shows positioning of a probe 12 substantially parallel to the surface of the sheet 7.

That sequence of events is shown carried out in-line in FIG. 3. There the sheet 7 is supplied from a roll 16. A punch 17, or other means, makes hole 8 and flap 9 and sealing material 10 are supplied from rolls and hot-stamped into place. A roll 18 produces the longitudinal lap join 11. Stamps 19 periodically produce transverse hot-welds 13 defining the ends of individual sealing members. Inner sealing material 6 and foam dams 14 are supplied from rolls. and a cutter 20 separates the final individual sealing members 1. They are then packed as shown at 21.

Figure 4A:
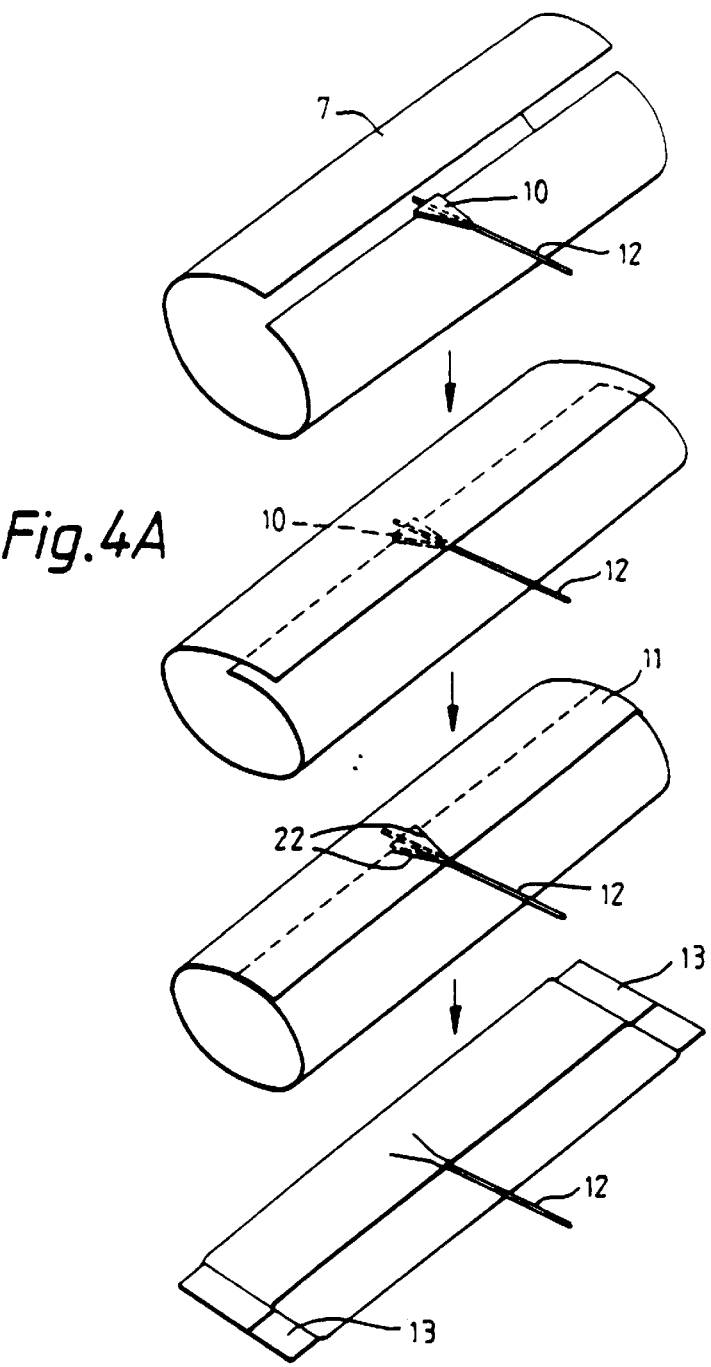
FIGS. 4A, 4B, and 4C show formation of a second embodiment of a sealing member.
Figure 4B:
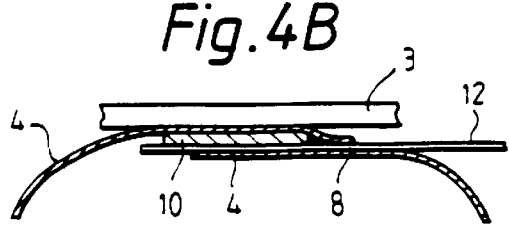
Figure 4C:
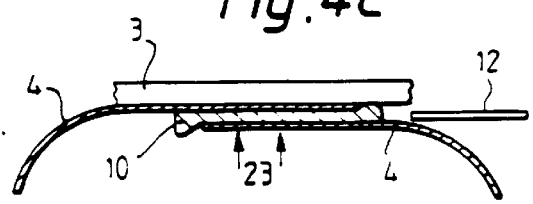

FIG. 4A shows a manufacturing technique similar to that shown in FIG. 2A. except the probe passes between two walls of lap join 11. rather than through a hole 8 through a single wall. A funnel-shaped hole 22 extends through the lap join 11 and contains a sealing material 10. FIGS. 4B and 4C show in cross-section the way in which probe 12 passes through sealing material 10 in the lap join between walls 4. Pressure 23 within the sealing member acts against the walls 4 which bear against the duct 3 ensuring a good seal. In general. it may be desirable that the hole 8 be positioned such that internal pressure acting on the flap (whether a separate flap as in FIG. 2A or one wall of a lap join as in FIG. 4A) urges the flap against the cable or duct.

The in-line process shown in FIG. 5 corresponds to the method of FIG. 4A. A shaped roller 24 may be used to hot-weld or bond the overlapping edges together in a way that leaves periodic funnel-shaped holes between them.

Figure 6:
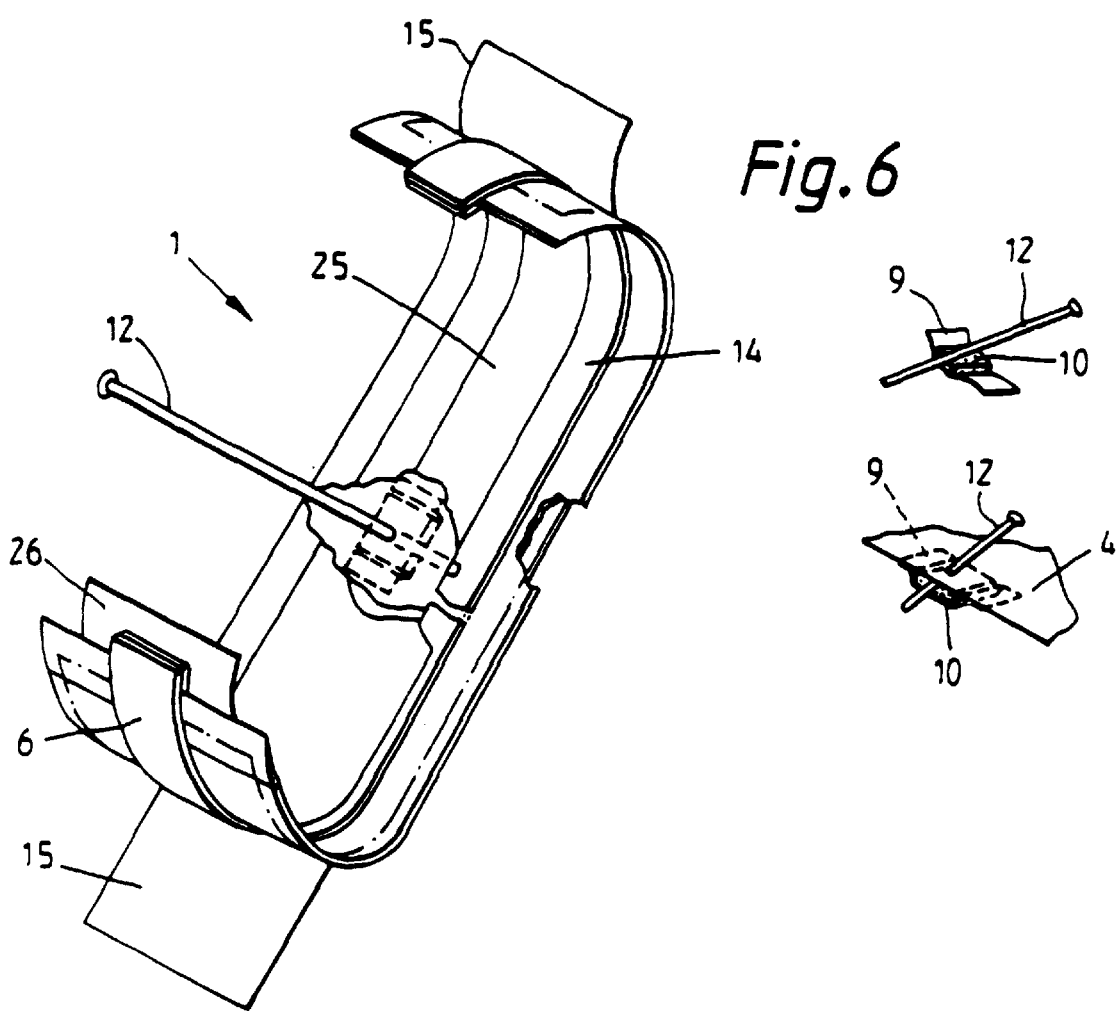
FIG. 6 shows various layers of a sealing member.

The sealing member 1 of FIG. 6 is shown in a partial wrapped-around configuration. The reference numbers correspond to those used above. In addition a layer of sealing material 6. such as mastic, is positioned on what will be an inwardly-facing surface that engages a cable.

Figure 7A:
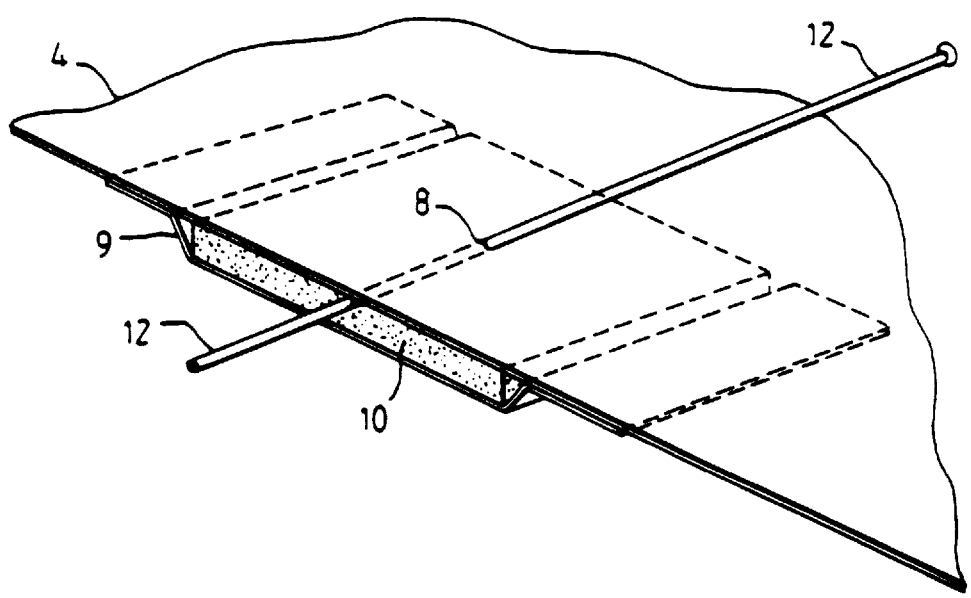
FIGS. 7A, 7B and 7C show use of a probe with a sealing member.
Figure 7B:
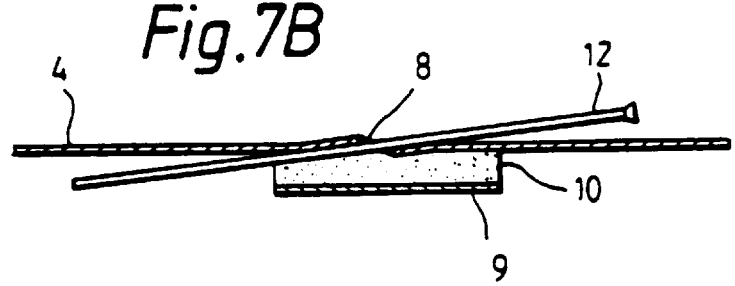
Figure 7C:
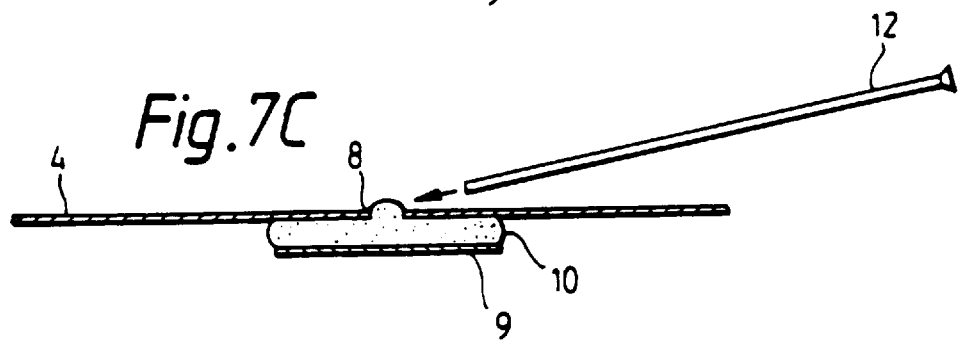

FIGS. 7A. 7B and 7C show insertion and withdrawal of a probe 12. The probe has been withdrawn by mere pulling, no unscrewing etc being necessary since it was previously held in place by mere friction or weak adhesion. It is surprising that satisfactory inflation and subsequent sealing can be achieved without a screw or bavonett or other mechanical connection between probe and wall. In FIG. 7C internal pressure has forced some sealing material 10 through hole 8 ensuring a perfect seal. Further layers may be used over the top of the article as shown, for example a mastic or other sealing material. optionally covered with a thin flexible film. Re-entry of a probe for deflation and/or for further pressurization may be possible in some embodiments. This will in general depend on whether the hole is visible and accessible in the installed product.

Figure 8:
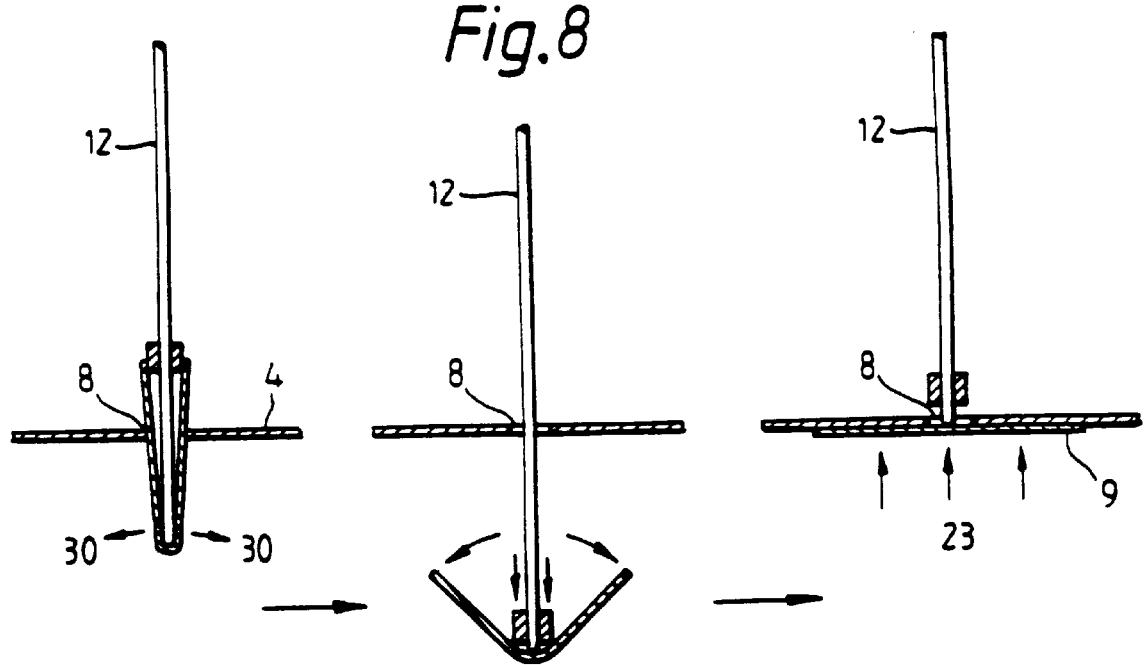
FIGS. 8 and 9 show ways of installing a sealing flap and plug in a sealing member.
Figure 8:
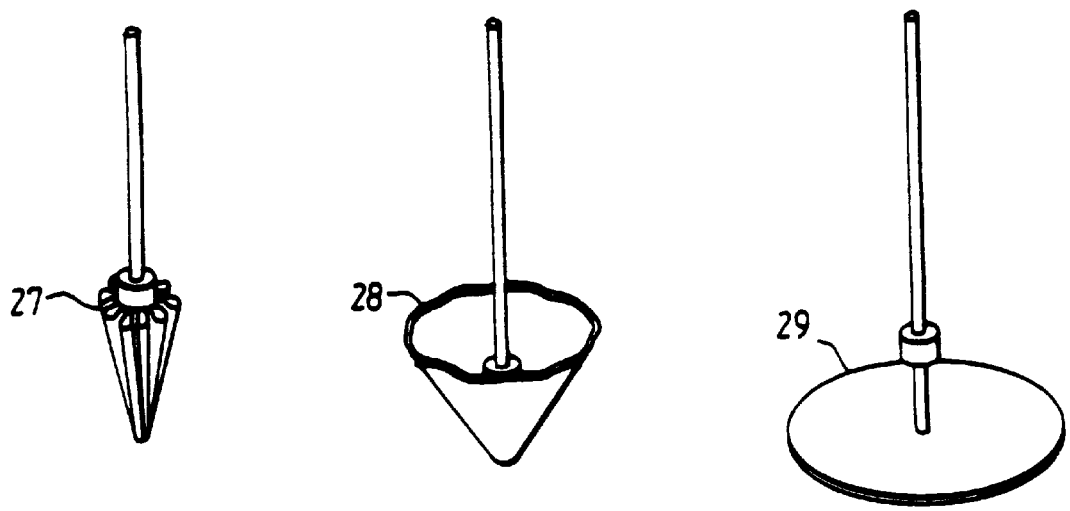

In FIG. 8 a flap is inserted into a sealing member, preferably after its manufacture, by means of a probe 12, preferably the probe used for inflation and preferably also as part of the inflating operation. A flap is carried by the probe 12, the flap being in a collapsed configuration as shown at 27. When the probe is slightly withdrawn, as shown in the centre part of the figure, the flap 28 begins to extend. On full withdrawal of the probe the flap 29 is fully extended. The process can be analogous to opening an umbrella.

The pressurizing gas can be seen leaving the probe at 30.

Figure 9:
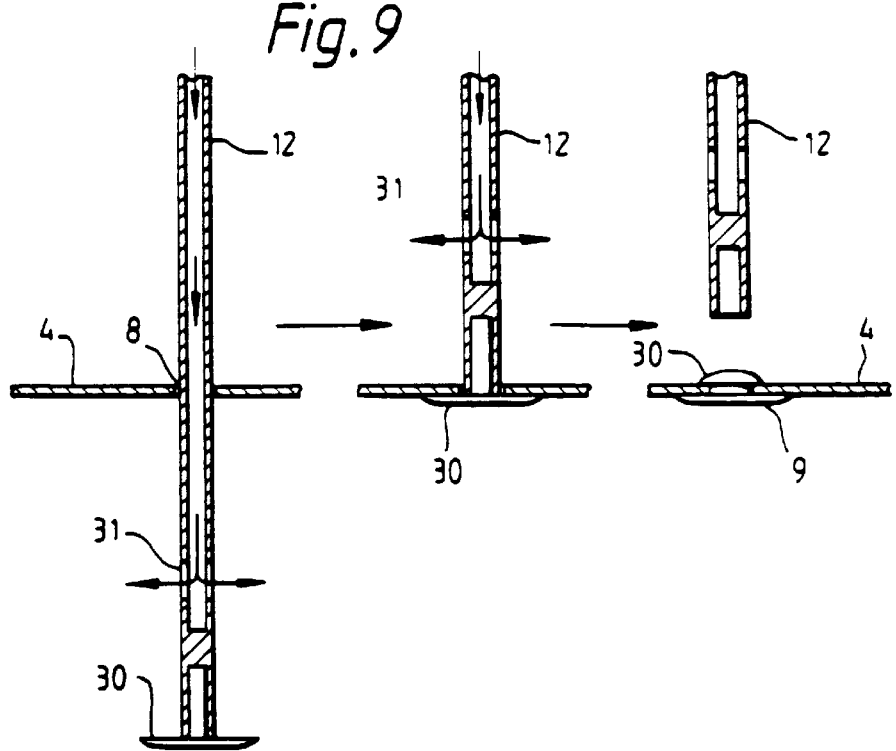

An alternative to the umbrella-like flap of FIG. 8 is a plug-like flap 30 of FIG. 9. The plug is carried at the end of probe 12, and an opening 31 for egress of air is provided above it. When the probe is fully inserted through hole 8, as shown in the left-hand part of the figure, opening 31 lies within the sealing member. The probe is then withdrawn, initially directing air outside of the sealing member (centre part of the figure), and finally leaving the plug to block the hole (right-hand part of the figure).

Figure 10A:
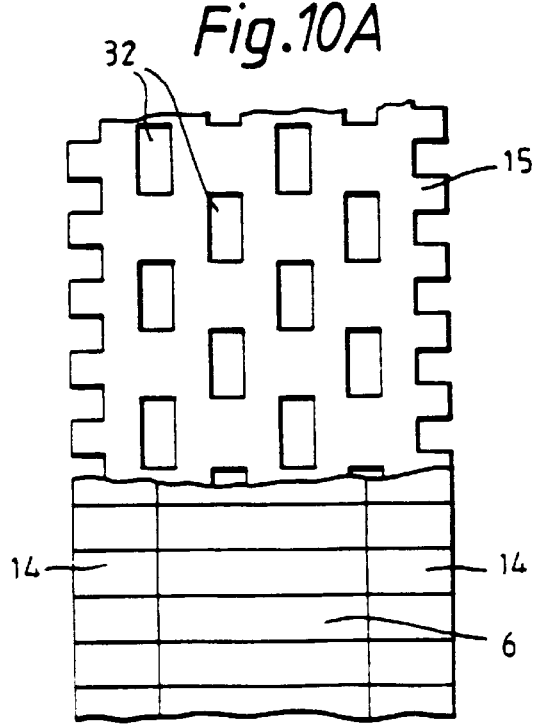
FIG. 10 shows sealing material used with a sealing member.
Figure 10B:
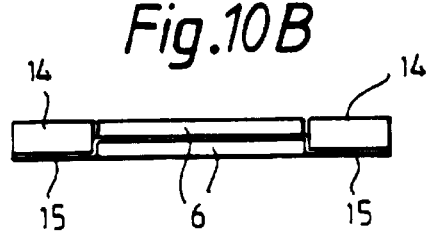
Figure 10C:
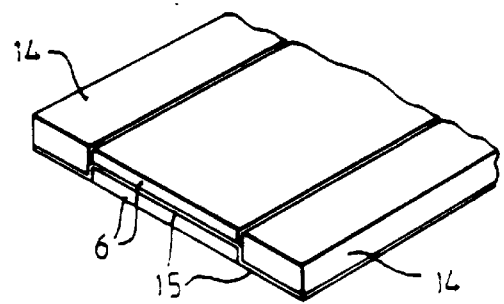

A composite sealing material strip, inventive in its own right, is shown in FIGS. 10A, 10B and 10C. Such a strip may be provided on an outer surface of the sealing member, especially in a direction that will be generally circumferential when the sealing member is wrapped around a cable. The sealing strip comprises a mastic or other sealing material 6 between foam or other dams 14 and a thin flexible layer 15 of cling film or other suitable material. The layer 15 may have perforations 32 therethrough and may extend between two layers of mastic, and over an outer surface of the foam dams as shown in FIGS. 10B and 10C.

FIGS. 11A, 11B, 11C and 11D show the sealing member used to seal an outlet of a cable splice case 33 housing a branched cable splice. FIG. 11A shows two cables 34 leaving a housing 35. A cross-section near the end of the housing is shown in FIGS. 11B and 11C. In FIG. 11B one sealing member 1 has been wrapped around the two cables, and is shown before inflation. In FIG. 11C two sealing members 1 are used, one around each cable. The effect of inflating a sealing member is shown in FIG. 11D. The sealing member can be seen to seal the space between the housing 35 and the cables 34 thus preventing contaminants entering the splice case. (Overlapping layers of the sealing member are shown slightly separated for clarity.) The housing 35 of FIG. 11D is of the wrap-around type, a closure being shown at 36.

For the avoidance of doubt it is mentioned here that the invention provides various sealing members, sealing materials and articles, and methods of manufacture and of use concerned with environmental sealing or blocking. In particular, any of the materials, article designs, sealing strips, valves may be selected.

I claim:

1. A flexible hollow sealing member inflatable to seal a gap between first and second articles, the sealing member comprising:
   (a) at least one wall;
   (b) a hole directly through said at least one wall or between more than one of said at least one walls, through which a probe is insertable to introduce pressurizing medium into the member;
   (c) an internal flap which extends across the hole inside the sealing member; and
   (d) gel sealing material provided between the internal flap and said at least one wall, wherein the internal flap and the gel sealing material automatically seal the hole upon withdrawal of the probe from the hole subsequent to inflation of the sealing member.

2. A sealing member according to claim 1 in which the internal flap comprises a flexible polymeric sheet fixed to said at least one wall of the member such that the probe can pass between the flap and said at least one wall substantially in the plane of the wall.

3. A sealing member according to claim 1, in which the hole is between overlapping walls of a lap join, the hole through the lap join decreasing in cross-sectional size towards the outside of the sealing member, the gel sealing material being provided within the hole such that it is driven by internal pressure to block the hole.

4. A sealing member according to claim 1 which comprises a laminate of a metal and a polymeric material.

5. A sealing member according to claim 1, having a second sealing material on an external surface thereof.

6. A sealing member according to claim 1, in which said at least one wall is substantially non-stretchable under installation and service conditions.

7. A sealing member according to claim 5, in which means is provided to restrict displacement of the second sealing material.

8. A sealing member according to claim 7, in which the means for restricting comprises a strip of foam.

9. A sealing member according to claim 5, in which the second sealing material has on an outwardly-facing surface thereof a thin flexible polymeric film that allows the second sealing material to deform, that has low tack and a high coefficient of friction.

10. A sealing member according to claim 9, in which the film has apertures therein.

11. A sealing member according to claim 1, in the form of an elongate envelope that can be wrapped around a cable.

12. A flexible hollow sealing member inflatable to seal a gap between first and second articles, the sealing member comprising:
   (a) at least one wall;
   (b) a hole through said at least one wall or between more than one of said at least one walls, through which a pressurizing medium is introducable into the member;
   (c) an internal flap; and
   (d) gel sealing material provided between the internal flap and said at least one wall, wherein the internal flap and the gel sealing material seal across the hole in response to pressure within the member.

13. A sealing member according to claim 12, in which said at least one wall is substantially non-stretchable under installation and service conditions.

14. A sealing member according to claim 12, in which the hole is between overlapping walls of a lap join, the hole through the lap join decreasing in cross-sectional size towards the outside of the sealing member, the gel sealing material being provided within the hole such that it is driven by internal pressure to block the hole.

15. A sealing member according to claim 12 which comprises a laminate of a metal and a polymeric material.

16. A sealing member according to claim 12, having a second sealing material on an external surface thereof.

17. A sealing member according to claim 16, in which means is provided to restrict displacement of the second sealing material.

18. A sealing member according to claim 17, in which the means for restricting comprises a strip of foam.

19. A sealing member according to claim 16, in which the second sealing material has on an outwardly-facing surface thereof a thin flexible polymeric film that allows the second sealing material to deform, that has low tack and a high coefficient of friction.

20. A sealing member according to claim 19, in which the film has apertures therein.

21. A sealing member according to claim 12, in the form of an elongate envelope that can be wrapped around a cable.

* * * * *